United States Patent
Dharssi et al.

(10) Patent No.: US 9,349,053 B2
(45) Date of Patent: May 24, 2016

(54) METHOD AND SYSTEM OF IDENTIFYING NON-DISTINCTIVE IMAGES/OBJECTS IN A DIGITAL VIDEO AND TRACKING SUCH IMAGES/OBJECTS USING TEMPORAL AND SPATIAL QUEUES

(71) Applicant: IN SITU MEDIA CORPORATION, Vancouver (CA)

(72) Inventors: Fatehali T. Dharssi, Vancouver (CA); Ashley McKay, Vancouver (CA)

( * ) Notice: Subject to any disclaimer, the term of this patent is extended or adjusted under 35 U.S.C. 154(b) by 0 days.

(21) Appl. No.: 14/401,052

(22) PCT Filed: May 14, 2013

(86) PCT No.: PCT/CA2013/000483
§ 371 (c)(1),
(2) Date: Nov. 13, 2014

(87) PCT Pub. No.: WO2013/170362
PCT Pub. Date: Nov. 21, 2013

(65) Prior Publication Data
US 2015/0139488 A1 May 21, 2015

Related U.S. Application Data

(60) Provisional application No. 61/646,859, filed on May 14, 2012.

(51) Int. Cl.
| | |
|---|---|
| *G06K 9/00* | (2006.01) |
| *G06Q 30/02* | (2012.01) |
| *G06K 9/32* | (2006.01) |
| *H04N 21/2389* | (2011.01) |
| *H04N 21/81* | (2011.01) |
| *H04N 21/854* | (2011.01) |
| *G06T 7/00* | (2006.01) |
| *H04N 5/225* | (2006.01) |
| *H04N 5/272* | (2006.01) |

(52) U.S. Cl.
CPC .......... *G06K 9/00711* (2013.01); *G06K 9/3241* (2013.01); *G06Q 30/02* (2013.01); *G06Q 30/0241* (2013.01); *G06T 7/0042* (2013.01); *G06T 7/0046* (2013.01); *H04N 21/23892* (2013.01); *H04N 21/812* (2013.01); *H04N 21/8146* (2013.01); *H04N 21/854* (2013.01); *G06T 2207/10016* (2013.01); *G06T 2207/20076* (2013.01); *G06T 2207/30204* (2013.01); *H04N 5/2723* (2013.01)

(58) Field of Classification Search
CPC ......... G06K 9/00; H04N 21/00; G06Q 30/00; G06T 7/00
USPC .......... 382/103, 107, 236; 348/169, 170, 171, 348/172, 352
See application file for complete search history.

(56) References Cited

U.S. PATENT DOCUMENTS

| | | | | |
|---|---|---|---|---|
| 2008/0104634 | A1* | 5/2008 | Gajdos | G06Q 30/0256 725/36 |
| 2008/0126226 | A1* | 5/2008 | Popkiewicz | G06Q 30/02 705/26.1 |
| 2010/0257551 | A1* | 10/2010 | Sweeney | H04N 7/165 725/34 |

FOREIGN PATENT DOCUMENTS

WO  2008/008959 A2  1/2008

OTHER PUBLICATIONS

International Search Report, mailed Aug. 20, 2013, for PCT/CA2013/000483, 3 pages.
Hu, Weiming, et al., "A Survey on Visual Surveillance of Object Motion and Behaviors," IEEE Transactions on Systems, Man and Cybernetics—Part C: Applications and Reviews, vol. 34, No. 3, Aug. 2004.
Kameda, Yoshinari, et al., "Outdoor See-Through Vision Utilizing Surveillance Cameras," Third IEEE and ACN International Symposium on Mixed and Augmented Reality (ISMAR 2004).
Tsapanos, Nikolaos, et al., "Toward Automated Post-Production and Semantic Annotation of Films," 2011 International Conference on Image Information Processing (ICIIP 2011).

* cited by examiner

*Primary Examiner* — Abolfazl Tabatabai

(57) ABSTRACT

A method and system to identify and locate images/objects which may be characterized as non-distinctive or "featureless" and which would be difficult to locate by conventional means comprises a plurality of steps including identifying first and second frame markers, increasing granularity between the frame markers, identifying at least one dominant object between the frame markers, normalizing its shape and identifying its edges, dissecting the dominant object into at least two equally sized sections; identifying shape and characteristics of at least one section (the analyzed section) of the dominant object thereby creating section data; applying geometric modeling such that section data from the analyzed section is used to determine overall shape, facets and configuration of the dominant object, thereby forming a geometric model; comparing geometric model to a known reference database of objects like the non-distinctive object (the reference object); and assessing the probability that the geometric model so formed represents the desired non-distinctive object.

20 Claims, No Drawings

METHOD AND SYSTEM OF IDENTIFYING NON-DISTINCTIVE IMAGES/OBJECTS IN A DIGITAL VIDEO AND TRACKING SUCH IMAGES/OBJECTS USING TEMPORAL AND SPATIAL QUEUES

FIELD OF INVENTION

This invention relates to digital video, such as that available via the Internet, and more particularly to identifying and optionally altering and substituting images in such digitized videos.

BACKGROUND OF THE INVENTION

Digital cinema or digital media creation is the process of capturing moving pictures as digital images, rather than on film. Digital capture may occur on video tape, hard disks, flash memory, or other media which can record digital data. As digital technology has improved over the years, this practice has become increasingly common and in fact many television shows and feature films are now shot partially or fully in digital format.

With the prevalence of these videos, it is considered desirable and useful to be able to manipulate digital images after creation/production. There are various reasons for this. Realistic content modification can change a scene context, offer product placement, offer advertising and adapt content aesthetics based on user preferences.

Specifically with regard to digital product placement, there is a huge demand for replacement of products or insertion de novo of products into appropriate scenes. Since the inception of TiVo in 1997, digital video recorders (DVRs) have quickly become a staple in many households. One significant reason consumers prefer this technology is because it gives them the ability to skip commercials that appeared in a show's original broadcast. Complementing this trend, viewers can now watch many of their favorite television shows online or, in the alternative, download commercial-free episodes onto their computers or portable media players (e.g., iPods® or even cell phones) for a small charge.[1] This mode of viewing shows no signs of slowing.

[1] See, for example Apple-iTunes, http://www.apple.com/itunes/store/tvshow-shtml (providing instructions on how to download TV shows onto iTunes, for viewing on a computer, or uploading onto a portable media device such as an iPod)

Such digital advances do not solely impact television viewers. Due to the increased use of this commercial-skipping technology, advertisers have had to find new ways beyond the traditional thirty-second commercial to get their messages out. Strategic product placement has been a welcome replacement. A market research firm found that the value of television product placement jumped 46.4% to $1.87 billion in 2004, and predicted (correctly) that the trend will likely continue due to the "growing use of [DVRs] and larger placement deals as marketers move from traditional advertising to alternative media.[2]

[2] See Johannes, TV Placements Overtake Film, supra note 15 (quoting a marketing association president as saying "product placement is the biggest thing to hit the advertising industry in years," and noting that PQ Media predicts the value of product placement will grow at a compound rate of 14.9% to reach $6.94 billion by 2009).

Although product placement has been around in some form for years, the new focus on merchandising is via digital product placement or replacement. Digital product placement occurs when advertisers insert images of products into video files after they have already been created. For example, such technology has been used for years to superimpose a yellow first-down line into football broadcasts or to insert product logos behind home plate during televised baseball games.[3]

[3] See Wayne Friedman, Virtual Placement Gets Second Chance, ADVERTISING AGE, Feb. 14, 2005, at 67 (discussing efforts to incorporate digital product placement into television).

Within the digital video space, internet based video has continued to become a rapidly growing source of published content. The publishing sources include movies and TV programs, and are often streamed or downloaded over a network as digital data. Accordingly, on-line videos of the type available on services such as YouTube® have become a source of live music, comedy, education and sports programming. These videos are usually sent digitally to a viewer's computer, an "intelligent" TV, or a mobile computing device.

As online video viewing has become very prominent on the global Internet, the need to advertise in this medium has also gained popularity. Promotional content delivery methods offered with and around transmitted Internet videos is widely sought by numerous progressive advertisers—both to supplement and complement traditional advertising on television, radio and print media. Such advertisers are constantly seeking advertising that is targeted based on viewer's demographic, purchase behavior, attitudinal and associated data. Accordingly, some advertisers prefer to understand the context of online videos in order to improve advertising content relevance. Some examples of reasons to perform detailed scene-by-scene video content analysis include:

a. To subtly place products in the background of video scenes for viewers to notice, one would need to know the detailed scene content layout for appropriate product location placement. As an example, if a brand wished to advertise prior to a user requested video being shown the viewer (popularly known in the industry as Pre-Roll ads), or as a banner advert at the bottom of the video frame while the video is being played, it is important for the company to know if any competing products are part of existing video scenes to minimize conflicting messages to a viewer.

b. If a company is running Pre-Roll ads it may also wish to place a branded promotional item on a table in the appropriate scenes of videos to increase advertising impact. One may also prefer to place an item as part of the background content if the advertiser prefers a more passive product placement location. To avoid impacting the video scene contextually, the system must account for identifiable items that comprise the scene, and decide if it is appropriate for product placement.

Currently, automated computer vision based video scene item identification is based on:

Identifying dominant distinctive features of reference items, and searching for such features in a frame-by-frame analysis of digital video. Commonly, this method in industry parlance is known as feature matching.

Placing artificial "glyph" markers or bar codes in videos for post-production video analysis and/or editing Using computer learning algorithm programs that compare numerous images of various instances of a similar item. These programs analyze the source images to make a statistical inference about the recurring characteristics of the items. These recurring consistent characteristics are often used to identify similar items in a frame-by-frame analysis of digital video.

These methods cannot reliably analyze post production video to find items that are, analytically, important but without discernible features that are common to all forms of such items. For example, one could find a can of Coke® using learning algorithms to process known pictures of Coke logos and thereafter to find Coke products in a video, but this these known methods cannot identify truly featureless generic items like tables, TV or computer screens. Feature based analytical approaches become unreliable for some items since generic items will appear in numerous shapes, sizes, orientations, extraneous features and colors. Additionally, a generic item or region may look contiguous when placed near the background wall color or floor coverings in a two dimensional frame. Even finding a single type of a table in digital video with distinctive feature based identification programs is difficult since the appearance of a table may be visually similar to the carpet or the walls in the scene. Such features are easily discernible to a human vision system which interprets all images we see in the context of our past experience. However, it is much more difficult for a computer to analyze a two dimensional frame of just colored-dots (i.e. pixels or pel data). Additionally, even if a generic item is momentarily discernible to have distinctive features it will quickly become an unreliable property since the visual appearance of a surface and its surroundings will change as the camera perspective or lighting conditions shift.

Generally, feature based analysis methods only work if the item has discernible and distinctive features (in terms of color, shape, or intensity gradients) that can be consistently identified by a computer program over numerous scenes in videos. Additionally, learning algorithms only work if an item is structurally similar across a wide range of circumstances—for example a human face would cause a learning algorithm to focus on the spatial consistency of the location of shadows cast by people's eyebrows, nose, and chin.

Therefore, it is currently difficult to detect items that do not have distinctive features and yet this is a critical requirement for many product placements. It is an object of the present invention to obviate or mitigate the above disadvantages such that non-distinctive digital images can be readily and accurately identified and thereafter, as desired, manipulated.

SUMMARY OF THE INVENTION

This present invention provides a method and system to identify and locate images/objects which may be characterized as non-distinctive or "featureless" and which would be difficult to locate by conventional means.

The present invention provides, in one aspect, a method and system to identify and locate images/objects which may be characterized as non-distinctive or "featureless" and which would be difficult to locate by conventional means which comprises a plurality of steps including identifying first and second frame markers, increasing granularity between the frame markers, identifying at least one dominant object between the frame markers, normalizing its shape and identifying its edges, dissecting the dominant object into at least two equally sized sections; identifying shape and characteristics of at least one section (the analyzed section) of the dominant object thereby creating section data; applying geometric modeling such that section data from the analyzed section is used to determine overall shape, facets and configuration of the dominant object, thereby forming a geometric model; comparing geometric model to a known reference database of objects like the non-distinctive object (the reference object); and assessing the probability that the geometric model so formed represents the desired non-distinctive object.

The present invention provides, in another aspect, a computer implemented method of identifying the position of a desired non-distinctive object in a digital video which comprises:

a) analyzing the video, by intermittent frames, to identify a physical scene or content change and wherein such change occurs between a first frame marker and a second frame marker, such frame markers not necessarily being directly sequential;
b) identifying an item within one frame marker or between the first frame marker and the second frame marker which exhibits identifiable stability (the "framed item");
c) increasing granularity of analysis of the frame content (between the first frame and the second frame), comprising the framed item, by removing one or both of i) extraneous sections of the frame content; and ii) frame perimeters, thereby forming a targeted frame content;
d) identifying one or more dominant features within the targeted frame content using surface analysis, thereby identifying one or more dominant objects;
e) for at least one of the dominant objects (the dominant object), normalizing its shape and identifying its edges;
f) dissecting the dominant object into at least two equally sized sections;
g) identifying the shape and characteristics of at least one section (the analyzed section) thereby creating section data;
h) applying geometric modeling such that section data from analyzed section is used to determine overall shape, facets and configuration of the dominant object, thereby forming a geometric model;
i) comparing geometric model to a known reference database of objects like the non-distinctive object (the reference object); and
j) assessing the probability that the geometric model so formed represents the desired non-distinctive object.

The present invention provides, in another aspect, a system for identifying and altering a non-distinctive image within a digital video file including: A) a first computer requesting the digital video file from a second computer over a network; B) at least one of the first or second computers configured to:

a) analyze the video, by intermittent frames, to identify a physical scene or content change and wherein such change occurs between a first frame marker and a second frame marker, such frame markers not necessarily being directly sequential;
b) identify an item within one frame marker or between the first frame marker and the second frame marker which exhibits identifiable stability (the "framed item");
c) increase granularity of analysis of the frame content (between the first frame and the second frame), comprising the framed item, by removing one or both of i) extraneous sections of the frame content; and ii) frame perimeters, thereby forming a targeted frame content;
d) identify one or more dominant features within the targeted frame content using surface analysis, thereby identifying one or more dominant objects;
e) for at least one of the dominant objects (the dominant object), normalize its shape and identifying its edges;
f) dissect the dominant object into at least two equally sized sections;
g) identify the shape and characteristics of at least one section (the analyzed section) thereby creating section data;
h) apply geometric modeling such that section data is used to determine overall shape, facets and configuration of the dominant object, thereby forming a geometric model;
i) compare geometric model to a known reference database of objects like the non-distinctive object (the reference object); and j) assess the probability that the geometric model so formed represents the desired non-distinctive object;

at least one of the first or second computers configured to; and i) repeat steps a) through j) on following data representing a non-distinctive image in a frame and for the same non-distinctive image in subsequent frames until the calculated probability does not exceed the confidence level.

The present invention provides, in another aspect, a non-transitory processor readable medium storing code representing instructions to cause a processor to identify the position of a desired non-distinctive object in a digital video, said identifying comprising the steps of:

a) analyzing the video, by intermittent frames, to identify a physical scene or content change and wherein such change occurs between a first frame marker and a second frame marker, such frame markers not necessarily being directly sequential;

b) identifying an item within one frame marker or between the first frame marker and the second frame marker which exhibits identifiable stability (the "framed item");

c) increasing granularity of analysis of the frame content (between the first frame and the second frame), comprising the framed item, by removing one or both of i) extraneous sections of the frame content; and ii) frame perimeters, thereby forming a targeted frame content;

d) identifying one or more dominant features within the targeted frame content using surface analysis, thereby identifying one or more dominant objects;

e) for at least one of the dominant objects (the dominant object), normalizing its shape and identifying its edges;

f) dissecting the dominant object into at least two equally sized sections;

g) identifying the shape and characteristics of at least one section (the analyzed section) thereby creating section data;

h) applying geometric modeling such that section data from analyzed section is used to determine overall shape, facets and configuration of the dominant object, thereby forming a geometric model;

i) comparing geometric model to a known reference database of objects like the non-distinctive object (the reference object); and j) assessing the probability that the geometric model so formed represents the desired non-distinctive object.

One advantage of using the method and system of the present invention is its main focus, which is a key point of differentiation as compared to prior image analysis methods: there is provided herein a method for processing Internet based video (digital streaming or online), and in particular a process to identify certain items in any type of digital video which, as necessary in conventional pattern recognition software, do not have discernible distinctive features nor structural similarities across a wide range or circumstances.

Feature based analysis methods only work if the item to be found has discernible and distinctive features (in terms of color, shape, or intensity gradients) that can be consistently identified by a computer program over numerous scenes in videos. So, if one is searching for an non-distinctive object, such as a table, a computer monitor or a television screen, to name a few, these will be difficult and in some cases impossible to locate using conventional, feature based analyses due to the simple fact that a TV screen on a wall will look identical to a picture in a frame etc. . . . However, these non-distinctive images/objects will be readily and accurately locatable in accordance with the method and system of the present invention.

DETAILED DESCRIPTION OF THE INVENTION

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured

I Terms

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The terms "video" and "video file" and "digital video media" as used herein" will be afforded a broad and expansive meaning and cover, for example, media in all format(s) which are capable of being electronically conveyed. These include, but are not limited to digital video files and the like.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "non-distinctive", in the context of images and objects, refers to those images and objects in a digital video file that do not have or possess distinctive characteristics in regard to the object's features such as shape, colour and structure and/or which features do not repeat consistently across various version of such an object. The term may be used interchangeably with "featureless".

It is to be understood that there are a wide variety of "target spaces" or "target objects" within any given one or more frames of video which one may wish to identify using the method of the present invention. For example, these include billboards, other type of signs (advertising and signs generally); rugs; cars and other type of vehicles; vehicle windows; sporting event signage and advertising media (for example LED displays at the edge of sports venues, fields, stadium etc. . . . where advertising is constantly changing during a game telecast); fencing, window panels, panels generally and tiles at sporting events; etc. These "target spaces" or "target objects" are generally non-distinctive (and hence hard to locate using conventionally and currently available methods) but they are often key points for eventual image addition and/or substitution. This may be illustrated best by way of example: it is desired to locate a particular signage board which is present during the telecast of a football game. Video of the game could be analyzed, using the method of the present invention to locate the board and then to add/substitute image content on the board.

It is also to be understood that the method of the invention is used to locate and identify a non-distinctive object within a target space or target object. This is not the situation of searching within a video file for a Coke bottle (distinctive) being held by a person (also distinctive). This is the case of searching to identify, for example, a computer screen or picture frame on a wall. Both are non-distinctive in and of themselves and the method of the invention applied in a nesting fashion can be used to achieve with accuracy in such identification.

The term "e.g." and like terms mean "for example", and thus does not limit the term or phrase it explains. For example, in a sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g. 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. .section 1.72(b). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The invention can be implemented in numerous ways, including as a process, an apparatus, a system, a computer readable medium such as a computer readable storage medium or a computer network wherein program instructions are sent over optical or communication links. In this specification, these implementations, or any other form that the invention may take, may be referred to as systems or techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

The following discussion provides a brief and general description of a suitable computing environment in which various embodiments of the system may be implemented. Although not required, embodiments will be described in the general context of computer-executable instructions, such as program applications, modules, objects or macros being executed by a computer. Those skilled in the relevant art will appreciate that the invention can be practiced with other computer configurations, including hand-held devices, multiprocessor systems, microprocessor-based or programmable consumer electronics, personal computers ("PCs"), network PCs, mini-computers, mainframe computers, and the like. The embodiments can be practiced in distributed computing environments where tasks or modules are performed by remote processing devices, which are linked through a communications network. In a distributed computing environment, program modules may be located in both local and remote memory storage devices.

A computer system may be used as a server including one or more processing units, system memories, and system buses that couple various system components including system memory to a processing unit. Computers will at times be referred to in the singular herein, but this is not intended to limit the application to a single computing system since in typical embodiments, there will be more than one computing system or other device involved. Other computer systems may be employed, such as conventional and personal computers, where the size or scale of the system allows. The processing unit may be any logic processing unit, such as one or more central processing units ("CPUs"), digital signal processors ("DSPs"), application-specific integrated circuits ("ASICs"), etc. Unless described otherwise, the construction and operation of the various components are of conventional design. As a result, such components need not be described in further detail herein, as they will be understood by those skilled in the relevant art.

A computer system includes a bus, and can employ any known bus structures or architectures, including a memory bus with memory controller, a peripheral bus, and a local bus. The computer system memory may include read-only memory ("ROM") and random access memory ("RAM"). A basic input/output system ("BIOS"), which can form part of the ROM, contains basic routines that help transfer information between elements within the computing system, such as during startup.

The computer system also includes non-volatile memory. The non-volatile memory may take a variety of forms, for example a hard disk drive for reading from and writing to a hard disk, and an optical disk drive and a magnetic disk drive for reading from and writing to removable optical disks and magnetic disks, respectively. The optical disk can be a CD-ROM, while the magnetic disk can be a magnetic floppy disk or diskette. The hard disk drive, optical disk drive and magnetic disk drive communicate with the processing unit via the system bus. The hard disk drive, optical disk drive and magnetic disk drive may include appropriate interfaces or controllers coupled between such drives and the system bus, as is known by those skilled in the relevant art. The drives, and their associated computer-readable media, provide non-volatile storage of computer readable instructions, data structures, program modules and other data for the computing system. Although a computing system may employ hard disks, optical disks and/or magnetic disks, those skilled in the relevant art will appreciate that other types of non-volatile computer-readable media that can store data accessible by a computer system may be employed, such a magnetic cassettes, flash memory cards, digital video disks ("DVD"), Bernoulli cartridges, RAMs, ROMs, smart cards, etc.

Various program modules or application programs and/or data can be stored in the computer memory. For example, the system memory may store an operating system, end user application interfaces, server applications, and one or more application program interfaces ("APIs").

The computer system memory also includes one or more networking applications, for example a Web server application and/or Web client or browser application for permitting the computer to exchange data with sources via the Internet, corporate Intranets, or other networks as described below, as well as with other server applications on server computers such as those further discussed below. The networking application in the preferred embodiment is markup language based, such as hypertext markup language ("HTML"), extensible markup language ("XML") or wireless markup language ("WML"), and operates with markup languages that use syntactically delimited characters added to the data of a document to represent the structure of the document. A number of Web server applications and Web client or browser applications are commercially available, such those available from Mozilla and Microsoft.

The operating system and various applications/modules and/or data can be stored on the hard disk of the hard disk drive, the optical disk of the optical disk drive and/or the magnetic disk of the magnetic disk drive.

A computer system can operate in a networked environment using logical connections to one or more client computers and/or one or more database systems, such as one or more remote computers or networks. A computer may be logically connected to one or more client computers and/or database systems under any known method of permitting computers to communicate, for example through a network such as a local area network ("LAN") and/or a wide area network ("WAN") including, for example, the Internet. Such networking environments are well known including wired and wireless enterprise-wide computer networks, intranets, extranets, and the Internet. Other embodiments include other types of communication networks such as telecommunications networks, cellular networks, paging networks, and other mobile networks. The information sent or received via the communications channel may, or may not be encrypted. When used in a LAN networking environment, a computer is connected to the LAN through an adapter or network interface card (communicatively linked to the system bus). When used in a WAN networking environment, a computer may include an interface and modem or other device, such as a network interface card, for establishing communications over the WAN/Internet.

In a networked environment, program modules, application programs, or data, or portions thereof, can be stored in a computer for provision to the networked computers. In one embodiment, the computer is communicatively linked through a network with TCP/IP middle layer network protocols; however, other similar network protocol layers are used in other embodiments, such as user datagram protocol ("UDP"). Those skilled in the relevant art will readily recognize that these network connections are only some examples of establishing communications links between computers, and other links may be used, including wireless links.

While in most instances a computer will operate automatically, where an end user application interface is provided, a user can enter commands and information into the computer through a user application interface including input devices, such as a keyboard, and a pointing device, such as a mouse. Other input devices can include a microphone, joystick, scanner, etc. These and other input devices are connected to the processing unit through the user application interface, such as a serial port interface that couples to the system bus, although other interfaces, such as a parallel port, a game port, or a wireless interface, or a universal serial bus ("USB") can be used. A monitor or other display device is coupled to the bus via a video interface, such as a video adapter (not shown). The computer can include other output devices, such as speakers, printers, etc.

II Preferred Aspects of the Invention

The present invention provides a method to identify non-distinctive images and/or objects within a digital video file for the purpose of alteration or modification. For example, it may be desirable to locate a kitchen table for the purpose of digital insertion of an orange juice container thereon. More critically, within this invention, it is desirable to locate largely featureless objects such as television screens and computer monitors for the purpose of valuable and strategic product placement. Within a plurality of video segments, (within television shows and movies or via digital internet content), there may be a television screen behind some actors. It may be desirable, to have a commercial for a product such as Coca Cola@ or Crest® toothpaste or a Ford® vehicle inserted on that screen, to be playing during a scene. It may be desirable in some markets to have an advertisement of one product while in another market, the focus may be entirely different such that ease of 1) identification and 2) adaptability of image/object manipulation is the key.

Without knowing specifically where a, for example, television screen occurs in every digital file, making such an insertion (up to now) with existing technology has been challenging. Within the scope of the present invention, featureless objects can be readily identified and thereafter modifications, insertions or deletions made as desired to the file.

It is to be understood that there are a variety of different ways for images to be inserted into the digital file once the target point(s) of insertion have been identified and the present claims are not limited to any one such method. Exemplary methods of insertion include those developed by the present applicants and are covered in US Patent Publications 2011/0170772 and 2011/0267538, the contents of which are fully incorporated herein by reference. It is to be understood that such methods allow seamless insertion desired images.

In accordance with this invention, a digital video is generally analyzed frame-by-frame. Initially, the frames undergo preliminary analysis in fixed intervals, preferably at least every $20^{th}$ or $30^{th}$ frame in order to reduce processing time and to determine where there are significant changes in content location or physical scene layout. Once a scene is identified with an item that has minimal significant content changes, than the intervening frames between the two frame markers are reviewed in finer granularity to determine precisely when and where the item in the frame occurs.

The resulting selected section of video produces one contiguous scene known to contain the item, and must undergo analysis in greater detail. In the first frame of this scene, under this invention, the perimeter of a frame or other extraneous sections of the frame are excluded depending on what item is being identified. For example, if one is searching for a table or a computer/TV screen, this analysis most preferably starts with a scene analysis.

Preferably, part of the method as described herein employs a statistically derived visual vocabulary to classify a video's "scene context". This is done to improve computational feasibility of item detection routines, and ensures a detected item is consistent with the context of the video it which it appears. For example, a BMW® car would likely be correctly detected in an outdoor environment, like a city street, but is unlikely to occur with correct scale in an indoor environment like a kitchen. Thus, we can limit the number of stable ubiquitous search items based on the videos general location. A first element of the "scene context" or more specifically "general location analysis" step is an assessment, based on one or more stable ubiquitous search items whether a scene is "indoors" or "outdoors".

The item detection routine may use featureless geometric surface hypothesis models, contour analysis, or common feature matching based algorithms.

These approximation models are checked for match consistency, abnormal structures, and inferring object poses. Therefore, a frequency of occurrence for stable item positions is formed over intermittent non-linear video segments, and the continuity of modified video clip content remains undetectable.

There are at least two ways in which exclusionary judgments are made and used:

1) basic context analysis: if the non-distinctive object to be located is a table, and environs appropriate objects are detected around or on it, the probability increases that it is a table and not a carpet. Likewise, if one is searching for a table, one can remove from the analysis extraneous objects or images such a floor and ceiling, as the table will most likely appear between the two.

2) scene context: determining if a scene is outdoors or indoors by acquiring scene specific cues such as whether the scene has typical outdoor items such as forests, roads, snow, cars, etc. and if indoors whether it contains distinctive indoor objects and cues, such scene context allowing an increase in probability of degree of confidence as to location of non-distinctive object.

Using these cues, one may for example, in locating a table, make an assumption that such an item typically tend to be in the frame space between the ceiling and the floor in a room. By first excluding the perimeter of the room i.e. ceiling/floor, one can focus on the items in the center of the frame for analysis. This is done to minimize processing of extraneous items to improve performance. Alternatively, if the scene context is focused on something on a table region than the scene content would be predominately covered with the table surface with little else showing. Thus, the above procedural analysis approach would exclude the extraneous sections, and quickly infer the contiguous surfaces occupy most of the frame.

Thereafter, the dominant features in the reminder of the frame would be identified using surface analysis to determine if there are one or more items dominating the scene. Once a dominant item is determined to be present, the positional characteristics of this object shall be determined to start a process of geometric modeling.

The shape of the dominant features would then be normalized (i.e. the contours or line inferences are straightened if these are somewhat irregular) and the edges are identified. At this point the shape of this object would be dissected into two or more equal sections. The shape of the individual sections would then be used to determine the geometry of the whole item. An approximate geometric model is established, and analysis is done by comparing its likeness to a known reference list of ideal models. A comparison is made by making an assumption of the ideal region structure, comparing the facet consistency, and comparing predicted boundary matching errors.

A preliminary conclusion is thus made of the likelihood of the item identity being known, and thus analysis continues using conventional pattern recognition software that is generally available (like distinctive feature based analysis or learning algorithms as described previously) to identify other aggregated items (assuming these have distinctive and discernible features) in the scene. Thereafter, if analysis determines that the other items present are consistently co-located with the primary item being sought in the scene (based on a reference list), than the analysis infers an item is consistent with the item being sought. Note that a key feature of this invention is aggregation of multiple inferences to incrementally increase the probability of correctly identifying the item being analyzed.

Once the analysis concludes the existence of a desired item in a scene, than this item is tracked in subsequent scenes to determine how long the item is in the full video, movement of the item, changes in the characteristics surrounding the item (i.e. other associated items in the vicinity, lighting/shade changes, partial or full view of the desired item, etc.). Analysis is done by looking for finer granularity details of the item from scene-to-scene, predictive tracking of item in future frames/scenes by movement coordinate correlation filters based on the Rudolf E. Kálmán 1960 dynamics model.

Full analysis of this video, or at each intermediate stage, one would have a full picture of content items, and where such items occur in the video, spatial analysis of where there are likely (based on a reference list) instances to place a product or an advertising message in the video. Once this is determined, a product (like a can of Coke) or an advert (like a full video advert of Coke is played in a TV or a computer screen in the background of the video with or without any changes to audio, a screen saver on a TV/computer screen, a poster on a wall in the scene, or a "tank-top" is placed on an appropriate table in a scene).

Since analysis and additional item placement is prone to inaccuracies it is highly preferred that the final step in this system would use human reviewers to review the produced content, and classify the video in question. Thus, one or more person(s) on one or more computers confirm the identity of one or more items, and or the accuracy of additional item placements. The check is done either at each stage of the analysis or only on the final modified video produced. In addition, the human quality control process would provide validation data for future reference whereby such data is used in future analysis to improve the identification accuracy of the automated computer analysis.

Within the scope of the present invention image identification may be preferably made either at the server where the original video is stored, at the computer or device that the viewer is using to view the requested video, at an intermediate point or at multiple points/computer processors in such a network. Such identification (and possible latter alterations) may also be made, at the same time or at different times, not only in one process but in multiple sub-processes in multiple computing devices in such a network. Such video may be viewed on a mobile device like a Smartphone or tablet,
on a laptop, a desktop computer, or another type of a computer display device
on a TV screen which has some device like a cable set-top box, a programmable video recorder (PVR) or modem, to enable data and/or video communication, and/or software execution.

Such a video may be altered for reasons such as advertising (placement, removal or replacement of posters, product images, pictures, or other such items to advertise a product in a video scene) placement of a product image in such a video. This may be at the request of an advertiser or a video producer. One primary purpose for altering the image at the point of downloading is to enable advertising or product placement to be targeted to viewers based on a viewer's internet and product purchase data. As an example, if a viewer is a regular diet Coke® user (as evident for purchase data of such viewer obtained from supermarket scanners) or Facebook® data shows that the viewer has recently started a fitness program, then an advertiser may wish to place a can or a package of diet Pepsi® in an appropriate scene in a video being viewed by such a viewer. This would also include removing any conflicting or competing products that are shown in the original video.

Under this invention, the system initially identifies a video segment, frame sequence, or image area to be modified. The precise coordinates in each frame undergo further analysis in greater detail to better define a region to be modified.

In an alternative embodiment, "manipulating" with respect to an image means adding, removing, or otherwise modifying an existing image. It is preferred that the non-distinctive image is selected from the group consisting of digital or media display devices, computer monitors, laptop computers, tablets, Smartphones, electronic devices, walls, tables, floors, counters, and televisions.

Within some aspects of the invention, it is preferred that adjustment features are acquired from original digital video creator.

The present method and system can be used wherein the digital "video" file is either online or via streaming media. It is anticipated that there will be huge uptake and usage on YouTube® and the like online videos.

It is preferred that the image replacement, removal, manipulation or addition steps are carried out by a computer displaying or conveying media file. It is also preferred that said steps are carried out by a server storing said digital video file. It is further preferred that said steps are carried out by a computer receiving said digital video file from a server and transmitting said digital video file to a second computer.

It is preferred that, with the method as described herein, extraneous content is removed at step c) based on upon a likely position or orientation of the desired non-distinctive object within a scene. It is further preferred that least every $20^{th}$ frame is analyzed, more preferably at least every 40 frames. It is preferred that the assessment at step j) is made based upon a comparison of facet consistency, edge boundaries, and other character differences between the reference object (analogous to the desired non-distinctive object) and the dominant object. It is preferred that further confirmation of the matching of the desired non-distinctive object and the dominant object may be attained by pattern recognition analysis.

It is preferred that the method additionally comprises the step of the use of conventional pattern recognition methodologies to identify one or more distinctive images adjacent or in the environs of the desired non-distinctive object. In other words, supplementary data may be acquired by way of various technologies to identify distinctive images/objects.

It is preferred that the method additionally comprises a step, after step j (and confirmation that the geometric model so formed represents the desired non-distinctive object) of tracking said desired non-distinctive object in subsequent frames, other than those originally analyzed, to collect a database of object properties. It is most preferred that the object properties are selected from the group consisting of: length of time the desired non-distinctive object is in selected scenes, movement of the desired non-distinctive object, changes in environment of the desired non-distinctive object, changes in items adjacent to the desired non-distinctive object, lighting changes, shading changes, and visibility of the desired non-distinctive object.

It is preferred that the digital video file, as used herein, is in post-production. It is also preferred that a step j) comprises calculating a probability (X) that the geometric model so formed represents the desired non-distinctive object/image. It is preferred that the method additionally includes a step of manipulating the digital video file by means of at least the following steps which comprise: k) based on the comparison, calculating a probability that the geometric model so formed represents the desired non-distinctive object/image; and l) if the probability exceeds a confidence level, manipulating the digital video file by a means selected from the group consisting of altering, adding to and/or deleting (in whole or part) an image of desired non-distinctive object.

It is preferred that the image of desired non-distinctive object is altered by substituting a second image or by adding thereto or thereon a second image. It is further preferred that an image which replaces or supplements the desired non-distinctive object is a product which is altered by substitution for a second image of a second product. It is preferred that the desired non-distinctive object is a product which is altered by addition of data representing an image of a related product to said data representing a frame. It is most preferred that desired non-distinctive object is not deleted but is supplemented with an image of a distinctive object/image, such as, for example, supplementing an image of a computer screen with a sequence of images comprising targeted advertising.

It is preferred that the digital video file is streaming video and that the steps are carried out by a computer displaying the digital video file. It is further preferred that the steps are carried out by a server storing said digital video file and that the steps are carried out by a computer receiving said digital video file from a server and transmitting said digital video file to a second computer.

It is preferred that part of the process shown in the claims is done before the video is uploaded by the original publisher of the video to a central computer library for distribution to numerous viewers and the remaining part of the process is done at the central computer prior to a viewer requesting downloading of such video for viewing. It is preferred that the method is carried out by a software program product. Also, it is preferred that once the non-distinctive image/object has been identified with a desired degree of confidence, there comprises an additional step (or steps) of altering, adding to and/or deleting (the "manipulation") the identified non-distinctive image/object, wherein said manipulation is based on a history of purchase behavior of a user/viewer of the digital video. In a preferred form, part of the method of non-distinctive image/object identification, and then image manipulation is done before the video is uploaded by the original publisher of the video to a central computer library for distribution to numerous viewers and the remaining part of the process is done at the central computer prior to a viewer requesting downloading of such video for viewing.

It is most preferred that there is a final analysis before image manipulation by human eye/human quality control. Such human data (either confirming or denying accuracy of object identification) may be collected into a reference database. This database may be used to improve probability of future computerized identification of like images/objects and quality of image placement or alteration. In other words, such accumulated data will become another layer in the checkpoints or steps, each sequentially increasing the likelihood of accurate non-distinctive object/image identification.

As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various methods described above may omit some acts, include other acts, and/or execute acts in a different order than set out in the illustrated embodiments.

Further, in the methods taught herein, the various acts may be performed in a different order than that illustrated and described. Additionally, the methods can omit some acts, and/or employ additional acts.

These and other changes can be made to the present systems, methods and articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

III. Computing

Further and in addition to the disclosure provided above, it will be readily apparent to one of ordinary skill in the art that the various processes and methods described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., a computer program.

A "processor" means one or more microprocessors, central processing units (CPUs), computing devices, microcontrollers, digital signal processors, or like devices or any combination thereof.

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth®, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, and a combination of any of the above). Each of the devices may themselves comprise computers or other computing devices, such as those based on the Intel® Pentium™ or Centrino® processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various methods described above may omit some acts, include other acts, and/or execute acts in a different order than set out in the illustrated embodiments.

The present methods, systems and articles also may be implemented as a computer program product that comprises a computer program mechanism embedded in a computer readable storage medium. For instance, the computer program product could contain program modules. These program modules may be stored on CD-ROM, DVD, magnetic disk storage product, flash media or any other computer readable data or program storage product. The software modules in the computer program product may also be distributed electronically, via the Internet or otherwise, by transmission of a data signal (in which the software modules are embedded) such as embodied in a carrier wave.

For instance, the foregoing detailed description has set forth various embodiments of the devices and/or processes via the use of examples. Insofar as such examples contain one or more functions and/or operations, it will be understood by those skilled in the art that each function and/or operation within such examples can be implemented, individually and/or collectively, by a wide range of hardware, software, firmware, or virtually any combination thereof. In one embodiment, the present subject matter may be implemented via ASICs. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, flash drives and computer memory; and transmission type media such as digital and analog communication links using TDM or IP based communication links (e.g., packet links).

Example 1

A method of identifying objects in digital video scene(s) wherein such objects do not have distinctive characteristics relating to shape, color and structure and wherein such objects do not repeat consistently across various versions of such objects, comprises the following steps:

Determining if the scene is outdoors or indoors to focus accordingly based on the object being identified.

Analyzing the video frame by frame or every few frames to determine where there is a scene change in the video.

Detailed analysis of an identified scene to determine where and in which frames this particular item occurs based on its likely location in such video Detailed frame by frame analysis of the scene with the particular item, whereby any extraneous sections of the frame and the perimeter are excluded to focus on the desired item.

Use surface analysis on a section of the scene to determine if there is likely to be an item that may be like the target item Once a target item is determine to be likely to be located in the scene, use positional characteristics of the target object to conduct geometric modeling.

The shape of the dominant features of the selected item are normalized and edges/perceived edges (where possible) identified The shape of the target item is dissected into multiple sections.

Geometric modeling is applied each such section and such geometric conclusion on each section is used to determine the shape of the full target object.

Determine the probability of the identity of the target item by referring to data on such items identified in past analysis of other such videos.

Use conventional pattern recognition software to determine other objects with distinctive features that are on, near or in the vicinity of the target object.

Adjust the probability of the likelihood of the target object being in the scene based on other objects discerned in the scene in terms of the likelihood of such objects being co-located with the target items based on a reference list.

If the probability of the location of the target item is above the desired threshold level, than this item is tracked in subsequent scenes in this video by tracking finer granular details of the item from scene to scene.

Use predictive tracking of the target object in future frames/scenes by using movement coordinate correlation filters.

Analyze the region with the target item to find a surface with structural consistency using standard techniques like structure from motion.

Check that such region with structural consistency is in typical video camera focal view to enable an object that is rendered into the video to appear as a natural object for the target environment.

Adapt color, shade, orientation, lighting and other characteristics of the original video to the image of the inserted object so that the inserted object appears like it is part of the original video.

Alter image of the video (frame by frame) to place an image of a product or and advertising, etc.

Use human quality control to verify accuracy of video analysis and image placement.

Use data from human quality control and analysis to improve probability of future computerized identification of like images/objects and quality of image placement or alteration.

We claim:

1. A method of identifying the position of a desired non-distinctive object in a digital video which comprises:
   a) analyzing the video, by intermittent frames, to identify a physical scene or content change and wherein such change occurs between a first frame marker and a second frame marker, said frame markers not necessarily being directly sequential;
   b) identifying an item within one frame marker or between the first frame marker and the second frame marker which exhibits identifiable stability (as a framed item);
   c) increasing granularity of analysis of the frame content between the first frame and the second frame), comprising the framed item, by removing one or both of i) extraneous sections of the frame content; and ii) frame perimeters, thereby forming a targeted frame content;
   d) identifying one or more dominant features within the targeted frame content using surface analysis, thereby identifying one or more dominant objects;
   e) for at least one of the dominant objects, normalizing a shape of the dominant object and identifying a number of edges of the dominant object;
   f) dissecting the dominant object into at least two equally sized sections;
   g) analyzing at least one section to identify a shape and characteristics of the at least one section thereby creating section data;
   h) applying geometric modeling such that section data from analyzed section is used to determine overall shape, facets and configuration of the dominant object, thereby forming a geometric model;
   i) comparing the geometric model to a known reference database of reference objects like the non-distinctive object; and
   j) assessing the probability that the geometric model so formed represents the non-distinctive object.

2. The method of claim 1 wherein extraneous content is removed at step c) based on a likely position or orientation of the desired non-distinctive object within a scene.

3. The method of claim 1 wherein the assessment at step j) is made based upon a comparison of facet consistency, edge boundaries, and other character differences between the reference object and the dominant object.

4. The method of claim 1 wherein further confirmation of the matching of the desired non-distinctive object and the dominant object may be attained by pattern recognition analysis.

5. The method of claim 1 which additionally comprises tracking said desired non-distinctive object in subsequent frames, other than those originally analyzed, to collect a database of object properties.

6. The method of claim 5 wherein said properties are selected from the group consisting of: length of time the desired non-distinctive object is in selected scenes, movement of the desired non-distinctive object, changes in environment of the desired non-distinctive object, changes in items adjacent to the desired non-distinctive object, lighting changes, shading changes, and visibility of the desired non-distinctive object.

7. The method of claim 1, at step j comprises calculating a probability that the geometric model so formed represents the desired non-distinctive object.

8. The method of claim 1 which additionally includes manipulating the digital video file by means of the following steps which comprise: k) based on the comparison, calculating a probability that the geometric model so formed represents the desired non-distinctive object; and l) if the probability exceeds a confidence level, manipulating the digital video file by a means selected from the group consisting of altering, adding and/or deleting an image of desired non-distinctive object.

9. The method of claim 8 wherein the image of desired non-distinctive object is altered by substituting a second image.

10. The method of claim 8 wherein an image which replaces the desired non-distinctive object is a product which is altered by substitution for a second image of a second product.

11. The method of claim 8 wherein said desired non-distinctive object is a product which is altered by addition of data representing an image of a related product to a frame.

12. The method of claim 1 wherein said digital video file is streaming video.

13. The method of claim 1 wherein said steps are carried out by a computer displaying the digital video file.

14. The method of claim 1 wherein said steps are carried out by a server storing said digital video file.

15. The method of claim 1 wherein said altering, adding and/or deleting the desired non-distinctive object is based on a history of purchase behavior of a user/viewer of the video.

16. The method of claim 1 wherein said altering, adding and/or deleting the desired non-distinctive object is based on information regarding preferences of a user/viewer of the video, such preferences including internet behavioral patterns, such preferences being acquired by data mining.

17. The method of claim 1 wherein prior to step a) a scene context is analyzed to determine if a scene is outdoors or indoors by acquiring scene specific cues such as whether the scene has typical outdoor items such as forests, roads, snow, cars, and if indoors whether it contains distinctive indoor objects and cues such scene context allowing an increase in probability of degree of confidence as to location of non-distinctive object, based on knowledge of the likely location of the non-distinctive object.

18. The method of claim 1 additionally comprising a step of analyzing a region with the non-distinctive item to find a surface with structural consistency.

19. The method of claim 18 wherein structural consistency is analyzed using a structure in motion technique.

20. The method of claim 1 wherein at least one of colour, shade, orientation, and lighting is adapted to an image of an inserted object so that the inserted object appears as if it were part of an original video.

\* \* \* \* \*